(12) United States Patent
Merrill et al.

(10) Patent No.: US 7,291,407 B2
(45) Date of Patent: Nov. 6, 2007

(54) CERAMIC MATERIAL HAVING CERAMIC MATRIX COMPOSITE BACKING AND METHOD OF MANUFACTURING

(75) Inventors: Gary B. Merrill, Orlando, FL (US); Michael A. Burke, Pittsburgh, PA (US); Stefan Hoffmann, Muelheim (DE); Jay A. Morrison, Oviedo, FL (US); Marc Tertilt, Hattingen (DE); Daniel Hofmann, Orlando, FL (US); Daniel G. Thompson, Pittsburgh, PA (US)

(73) Assignee: Siemens Power Generation, Inc., Orlando, FL (US)

( * ) Notice: Subject to any disclaimer, the term of this patent is extended or adjusted under 35 U.S.C. 154(b) by 558 days.

(21) Appl. No.: 10/654,751

(22) Filed: Sep. 4, 2003

(65) Prior Publication Data

US 2004/0110041 A1 Jun. 10, 2004

Related U.S. Application Data

(60) Provisional application No. 60/408,642, filed on Sep. 6, 2002.

(51) Int. Cl.
*B32B 19/00* (2006.01)
(52) U.S. Cl. ...................................... 428/701
(58) Field of Classification Search ................ 428/402, 428/701, 313
See application file for complete search history.

(56) References Cited

U.S. PATENT DOCUMENTS

| | | | |
|---|---|---|---|
| 3,939,060 A * | 2/1976 | Hayes | 208/139 |
| 4,719,151 A * | 1/1988 | Chyung et al. | 428/428 |
| 4,837,230 A | 6/1989 | Chen et al. | |
| 5,407,740 A | 4/1995 | Jessen | |
| 5,436,042 A | 7/1995 | Lau et al. | |
| 5,687,787 A | 11/1997 | Atmur et al. | |
| 5,854,154 A | 12/1998 | Radford et al. | |
| 6,025,048 A * | 2/2000 | Cutler et al. | 428/105 |
| 6,528,190 B1 | 3/2003 | Campbell et al. | |
| 6,773,907 B2 * | 8/2004 | Hansen et al. | 435/220 |
| 2002/0168505 A1 | 11/2002 | Morrison et al. | |
| 2003/0059577 A1 | 3/2003 | Morrison et al. | |
| 2003/0207155 A1 | 11/2003 | Morrison et al. | |

FOREIGN PATENT DOCUMENTS

| EP | 0 252 046 A | 1/1988 |
|---|---|---|
| EP | 0 595 075 A2 | 5/1994 |

* cited by examiner

*Primary Examiner*—Jennifer McNeil
*Assistant Examiner*—Daniel Miller

(57) ABSTRACT

An article comprising a ceramic material having a ceramic matrix composite backing adapted for use in a gas turbine engine is provided. The article comprises a structural ceramic material having a hot side facing toward a high temperature environment and a cold side facing away from the high temperature environment; and a ceramic matrix composite composition having a strength greater than the strength of the ceramic material attached to the back of the cold side of the ceramic material, whereby crack initiation and propagation are inhibited by the ceramic matrix composition to a greater degree than by the ceramic material.

18 Claims, 2 Drawing Sheets

CERAMIC MATERIAL HAVING CERAMIC MATRIX COMPOSITE BACKING AND METHOD OF MANUFACTURING

CROSS REFERENCE TO RELATED APPLICATIONS

This application claims the benefit of U.S. Provisional Patent Application Ser. No. 60/408,642, filed Sep. 6, 2002.

FIELD OF THE INVENTION

This invention relates generally to the field of temperature resistant components and in particular, to an article comprising a structural ceramic material having a ceramic matrix composite backing and used as a component of a gas turbine engine such as a combustion liner.

BACKGROUND OF THE INVENTION

Gas turbine engines are known to include a compressor section for supplying a flow of compressed combustion air, a combustor section for burning fuel in the compressed combustion air, and a turbine section for extracting thermal energy from the combustion air and converting that energy into mechanical energy in the form of a rotating shaft. Many components that form the combustor and turbine sections are directly exposed to hot combustion gases, for example, the combustor liner, the transition duct between the combustor and turbine sections, and the turbine stationary vanes and rotating blades and surrounding ring segments.

It is also known that increasing the firing temperature of the combustion gas can increase the power and efficiency of the combustion turbine. Modern high efficiency combustion turbines have firing temperatures that exceed temperatures of about 1,600° C., and even higher firing temperatures are expected as the demand for more efficient engines continues. Thus, the cobalt and nickel based superalloy materials traditionally used to fabricate the structural gas turbine components must be aggressively cooled and/or insulated from the hot gas flow in order to survive long term operation in the aggressive high temperature combustion environment. Additionally, certain combustion turbine components and configurations demand that the insulating material also provide structural mechanical support and strength. For example, it is known to use ceramic tiles to form the combustion liner within the combustion section of the engine.

An issue associated with these structural ceramic tiles, however, is that they are known to crack when operational local stresses exceed the ceramic material properties. To further complicate matters, these cracks are caused by a variety of factors and formed in a variety of locations. If left unresolved, these cracks can propagate and expand until the tile fails. Thus, expense and time consuming periodic inspections are frequently required to ensure the tile are not cracked.

Accordingly, there is a need to reduce the time and cost associated with cracked ceramic combustion liner tiles. There is also a need to reduce the formation of cracks on ceramic combustion liner tiles.

SUMMARY OF THE INVENTION

A combustion turbine component comprising a structural ceramic material having a ceramic matrix composite backing for use in a high temperature environment is provided, as well as a method of manufacturing this hybrid material.

One aspect of the present invention involves an article of manufacture comprising: a structural ceramic material having a hot side facing toward a high temperature environment and a cold side facing away from the high temperature environment; and a ceramic matrix composite composition having a strength greater than the strength of the ceramic material attached to the back of the cold side of the ceramic material, whereby crack initiation and propagation are inhibited by the ceramic matrix composite to a greater degree than by the ceramic material.

Another aspect of the present invention involves a component of a gas turbine engine comprising: a structural ceramic material having a hot side facing toward a high temperature environment and a cold side facing away from the high temperature environment; a ceramic matrix composite backing having a strength greater than the strength of the ceramic material; and an adhesive arranged between the ceramic material and the ceramic matrix composite adapted to bond the back of the cold side of the ceramic material to the ceramic matrix composite, whereby crack initiation and propagation are inhibited by the ceramic matrix composite to a greater degree than by the ceramic material.

Another aspect of the present invention involves a method of manufacturing a combustion liner tile adapted for use in a combustion turbine engine comprising: providing a structural ceramic material having a hot side facing toward a high temperature environment and a cold side facing away from the high temperature environment; applying a layer of green ceramic matrix composite composition onto the structural ceramic material; and heating the ceramic matrix composite composition and the ceramic material to a temperature in excess of about 1100° C. to form the combustion liner tile having a strength greater than the strength of the ceramic material.

BRIEF DESCRIPTION OF THE DRAWINGS

These and other advantages of the invention will be more apparent from the following description in view of the drawings that include.

DETAILED DESCRIPTION OF THE INVENTION

The invention described herein employs several basic concepts. For example, one concept relates to a high temperature and crack resistant gas turbine engine component. Another concept relates to forming a hybrid material comprising a structural ceramic having a ceramic matrix composite backing adapted for use in a combustion turbine engine. Another concept relates to method of manufacturing such a hybrid material.

The present invention is disclosed in context of use as a combustion liner 2 within a gas turbine engine. The principles of the present invention, however, are not limited to combustion liners 2 or even gas turbine engine components. For example, the principles of the present invention can be used to fabricate other gas turbine components, such as transition ducts, blades, vanes and ring segments. For another example, the principles of the present invention can be used with aerospace applications, such as airplanes with turbine engines and reentry space vehicles having heat shields. For another example, the principles of the present invention can be used with materials other than ceramics. One skilled in the art may find additional applications for the apparatus, processes, systems, components, configurations, methods, and applications disclosed herein. Thus, the illustration and description of the present invention in context of an exemplary combustion liner 2 within a gas turbine engine is merely one possible application of the present invention.

Figure 1:
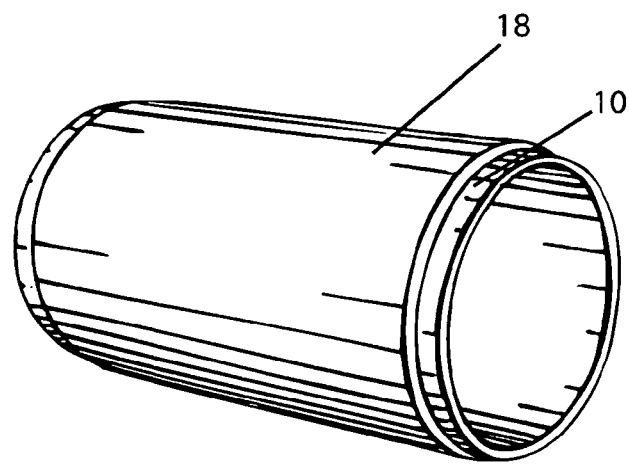
FIG. 1 is a perspective view of an exemplary gas turbine combustion liner of the present invention.
Figure 2:
FIG. 2 is a detail cross-sectional view of the combustion liner of FIG. 1 formed of a structural ceramic material having an adhesively attached ceramic matrix composite backing.

Referring now to FIGS. 1 and 2, an exemplary combustion liner 10 is provided. The illustrated combustion liner is shown 2 surrounded by an annular combustor 18 and connected to the combustor 18 by a plurality of clips 20, although many other combustor configurations and connection methods could be used as will be understood by those skilled in the art. The combustion liner 10 is advantageously formed from a plurality of ceramic tiles 12 with a ceramic matrix composite (CMC) 14 backing. The CMC 14 may be applied onto the ceramic 12 by a variety of techniques, as explained in more detail below. By this configuration, the CMC 14 resists crack formation and crack propagation on the ceramic tile 12.

The combustion liner 10 is advantageously formed of a plurality of ceramic tiles 12 that provide the requisite mechanical strength and thermal protection to withstand the thermal and mechanical stresses placed upon the combustion liner 10 during gas turbine engine operation and cycling. The ceramic tiles are advantageously capable of withstanding mechanical stresses of up to about 6 MPa and operating temperatures of up to about 1500° C. However, as will be understood by those skilled in the art, depending on the context of use, this range of mechanical stress and operating temperature could be appreciably greater or less. The ceramic material 12 may be formed of any ceramic, although it has been found advantageous to include alumina, silcia, zirconia, other binary oxides, and combinations thereof due to their strength and temperature resistance as well as their oxidation, corrosion and thermal shock resistance in aggressive high temperature environments. Also, the ceramic material 12 is illustrated as a plurality of tiles that can be formed of any size, shape, and thickness suitable to perform its structural and temperature resistant function, as well as formed as a monolith.

The CMC 14 is advantageously applied as a backing onto the ceramic tile 12 to provide resistance to crack formation and to crack propagation on the ceramic tile 12 during gas turbine engine operation and cycling. The CMC material 14 may be of the type described in U.S. pending patent application Ser. No. 09/631,097 filed Aug. 2, 2000, Ser. No. 09/962,733 filed Sep. 24, 2001, and Ser. No. 09/963,278 filed Sep. 26, 2001, each of the pending patent applications which are incorporated by reference in their entirely herein, or may be of the type described in U.S. patent application U.S. Pat. No. 5,854,154 which is incorporated by reference in its entirety herein.

The CMC material 14 advantageously includes any fiber reinforced matrix material or metal reinforced matrix material as may be known or later developed in the art, such as that commercially available from the COI Ceramics company under the name AS-N720. If a fiber reinforced material is used, the fibers may be oxide ceramics, non-oxide ceramics, or a combination thereof. For example, the oxide ceramic fiber composition can include those commercially available from the Minnesota Mining and Manufacturing company under the trademark Nextel, including Nextel 720 (alumino-silicate), Nextel 610 (alumina), and Nextel 650 (alumina and zirconia). For another example, the non-oxide ceramic fiber composition can include those commercially available from the COI Ceramics company under the trademark Sylramic (silicon carbide), and from the Nippon Carbon corporation limited under the trademark Nicalon (silicon carbide). The matrix material composition that surrounds the fibers may be made of an oxide or non-oxide material, such as alumina, mullite, aluminosilicate, yttria alumina garnet, silicon carbide, silicon nitride, silicon carbonitride, and the like. A CMC material 14 that combines a matrix composition with a reinforcing phase of a different composition (such as mulite/silica) or of the same composition (alumina/alumina or silicon carbide/silicon carbide) could also be used. The fibers may be continuous or long discontinuous fibers, and may be oriented in a direction generally parallel, perpendicular or otherwise disposed relative to the major length of the CMC material 14. The matrix composition may further contain whiskers, platelets, particulates, or fugitives therein. The reinforcing fibers may be disposed in the matrix material in layers, with the plies of adjacent layers being directionally oriented to achieve a desired mechanical strength.

Although it is possible to apply the CMC 14 backing onto the ceramic 12 tile in a variety of ways, due care should be made to suitably match the thermal expansion of these two materials in order to reduce interface stresses and strains. Applicants have found two approaches of joining the ceramic and CMC to be preferable, although many other approaches could be used. One approach involves bonding the fully fired CMC material 14 onto the finished ceramic material 12. The other approach involves processing and finishing the green CMC material 14 onto the finished structural ceramic material 12.

Referring to FIG. 2, the ceramic tile 12 and the CMC 14 are independently formed. During this independent formation, care should be taken to ensure that the tile 12 and CMC 14 have a similar, if not substantially similar or even exact, surface profile (e.g. length, width, curvature, perimeter, geometry) to facilitate attachment. The CMC material 14 is advantageously formed by laying up a series of pre-impregnated laminates, vacuum bagging the laminates to compress the laminates, drying the compressed laminates, autoclaving the dried compressed laminates, and then curing the laminate structure to form a finished profiled CMC 14 panel. Although the CMC 14 could be formed via other techniques, such as those described in more detail in the patents and patents applications previously incorporated by reference, and may include difference, additional or less processing steps. The ceramic material 12 is advantageously formed by pressing or casting green body particles and then firing the green body to a predetermined sintering temperature to form the finished ceramic tile 12.

The finished CMC 14 is then attached to the finished ceramic 12 (or vice-versa) by an adhesive 16 or bonding agent. Suitable adhesives 16 include fine powder ceramics such as mullite, alumina, silica and combinations thereof mixed or otherwise combined with a liquid binder such as silica sol, oxychloride solution and combinations thereof, although the ceramic need not be in fine powder form and the binder need not be in liquid form. Also, other types of adhesives 16 could also be used, such as those commercially available from the Cotronics corporation under the tradename Resbond and from the Aremco Products Inc under the tradename Ceramabond. The adhesive 16 is advantageously applied in a slurry form to the surface of the ceramic tile 12 (or CMC 14 or both 12, 14) and then the CMC panel 14 is applied to the slurry coated surface of the tile 14 and allowed to air dry. The hybrid structure is then advantageously further dried and heat treated to about 1000-1200° C. for about 1-3 hours to form a refractory bond between the two suitably thermally matched materials 12, 14. Using this type of ceramic adhesive 16, strengths of up to 6.2 MPa have been observed, although greater or less adhesive strengths could be achieved and used.

Of course, alternate bonding adhesive systems could be used such as glass frits, where a slurry of particulate glass particles are applied to the ceramic tile 12 surface and then the CMC 14 panel is applied to the glass slurry. The hybrid structure is then dried and heated to about 1000-1200° C. for about 1-3 hours such that the glass melts and wets the surface of the CMC 14. During cool down, and at the approximate anticipated operating use temperature, the glass forms a bond between the ceramic tile 12 and the CMC panel 14. Using this type of bond, strengths of up to 5.8 MPa have been observed, although greater or less bond strengths could be achieved and used.

The adhesive bonding agent 16 is shown completely covering the CMC 14 and ceramic 12 interface. However, the adhesive 16 need not be applied such that it completely covers the entire contact area between the cold side of the ceramic 12 and the CMC 14. For example, the adhesive 16 can be applied to selected portions of the cold side of the ceramic 12 such that the non-adhesive-applied portions of the ceramic 14 is physically decoupled from the CMC 14, which can help disseminate strain energy. Also, more than one type of adhesive 16 can be used, for example, bonding agents 16 with different strengths can be applied to different portions of the ceramic 14 and/or CMC 14 to assist with strain tolerance at or along selected portions of the ceramic 12.

Figure 3:
FIG. 3 is a detail cross-sectional view of the combustion liner of FIG. 1 formed of a structural ceramic material having a co-processed ceramic matrix composite backing.

Referring to FIG. 3, another aspect of the invention is provided where the nascent CMC 14 is processed and finished onto the finished structural ceramic 12. During this co-processing formation, the fibers of the CMC layer are first cut and applied to the tile surface and the matrix material is infiltrated around the fibers. This fiber application and matrix material infiltration may be repeated to build up the CMC material 14. Alternatively, a number of fabric plies of CMC prepreg material 14 (matrix material pre-impregnated with the fibers) may be cut to the surface profile of the tile and then stacked onto the backside of the tile 12. The stacked plies can then be vacuum bagged or otherwise compressed to compact the plies to the desired thickness. The finished tile 12 with green CMC backing is then preferably autoclaved and fired. Using this type of co-processing formation, strengths of up of 2.8 Mpa have been observed, although greater or less bonding strengths could be achieved and used. Suitable co-processing techniques are provided in more detail in U.S. patent application Ser. No. 10/245,528, titled "Composite Structure Formed By CMC-On-Insulation Process," which is incorporated herein by reference in its entirety.

An advantage of this co-processing application method is that it allows the CMC material 14 to conform to the contours of a shaped ceramic 12. Another advantage of this method is that minimal shrinkage of the CMC 14 occurs during co-processing, which provides an overall slight compressive force on the tile which assists in inhibiting crack propagation in the tile 12. Since the co-processed CMC 14 can be formed to partially or wholly encapsulate, sheath or trap the ceramic, it provides additional strength and reinforcement. Further, the co-processed CMC 14 could be applied such that the CMC 14 is thicker and thus stronger at certain high stress areas of the ceramic. An adhesive 16 or bonding system may also be used between the ceramic 12 and CMC 14 backing during the co-processing application to further secure the CMC 14 to the structural ceramic 12.

Figure 4:
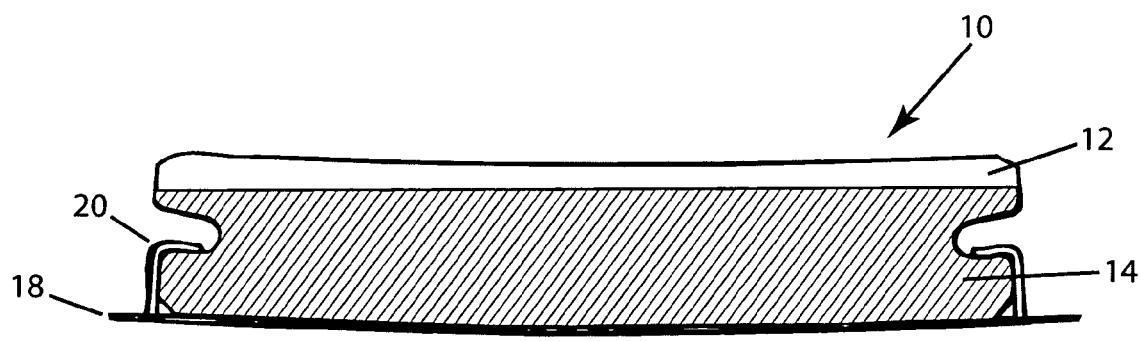
FIG. 4 is another embodiment of the combustion liner of FIG. 1 formed of a structural ceramic material having a co-processed ceramic matrix composite backing.

Referring to FIG. 4, another example of a co-processed CMC 14 on ceramic tile 12 combustion liner 10 is provided. In this embodiment, the CMC material 14 is applied on the upstream and downstream sides of the ceramic tile 12. This upstream and downstream application may be used in combination with either of the above-described CMC backing methods. Thus, the CMC 14 may be disposed on or along one or more edges or side surfaces of the ceramic tile 14 instead of or in additional to the backside of the ceramic tile 14.

Those skilled in the art will understand other suitable techniques to attach the CMC 14 and ceramic 12, such as structural means. For example, a clamp or dovetail groove. Also, the CMC 14 fibers or laminates can be oriented at different angles with respect to each other or the ceramic tile 12, for example, orienting the laminates at an angle of about 45° relative to the major axis of the ceramic tile 12 tends to provide increased ductility and strain tolerance, thereby inhibiting cracks and crack propagation in the tile 12.

During typical gas turbine operation, the combustion gas temperature is about 1400-1700° C. or greater, with the ceramic tile 12 normally reaching temperatures of about 1200-1500° C. and the CMC material 14 normally reaching temperatures of about 600-1100° C.

While the preferred embodiments of the present invention have been shown and described herein, it will be obvious that such embodiments are provided by way of example only. Aspects of one embodiment can be used or combined with aspects of one or more other embodiments. Numerous variations, changes and substitutions will occur to those of skill in the art without departing from the invention herein. Accordingly, it is intended that the invention be limited only by the spirit and scope of the appended claims.

We claim as our invention:

1. An article of manufacture, comprising:
   a structural ceramic material having a hot side facing toward a high temperature environment and a cold side facing away from the high temperature environment; and
   a ceramic matrix composite composition having a strength greater than the strength of the ceramic material selectively adhesively bonded to the cold side of the structural ceramic material to provide a varying degree of support across the cold side of the structural ceramic material,
   whereby crack initiation and propagation are inhibited within the structural ceramic material.

2. The article of claim 1, wherein the ceramic material is shaped to form a tile.

3. The article of claim 2, wherein the ceramic fiber comprises alumnosilicate particles.

4. The article of claim 2, wherein the ceramic matrix material comprises bonded alumina or mullite particles.

5. The article of claim 1, wherein the ceramic matrix composite comprises a ceramic fiber reinforced ceramic matrix material.

6. The article of claim 1, wherein the high temperature environment is a combustion gas from a combustion turbine engine.

7. The article of claim 1, wherein the high temperature environment is at least 1400° C.

8. The article of claim 1, wherein the ceramic material is silica or zirconia.

9. A component of a gas turbine engine comprising:
   a structural ceramic material having a hot side facing toward a high temperature environment and a cold side facing away from the high temperature environment;
   a ceramic matrix composite backing having a strength greater than the strength of the structural ceramic material; and
   an adhesive arranged between the structural ceramic material and the ceramic matrix composite adapted to selectively bond portions of the cold side of the structural ceramic material to the ceramic matrix composite with varying degrees of bonding across the cold side, whereby crack initiation and propagation in the structural ceramic material are inhibited by the ceramic matrix composite.

10. The article of claim 9, wherein the component is a combustion liner.

11. The article of claim 9, wherein one adhesive is applied onto only portions of the cold side of the ceramic material such that non-adhesive-applied portions of the structural ceramic material is decoupled from the ceramic matrix composite.

12. The article of claim 9, wherein more than one type of adhesive with differing strengths are applied to respective portions of the cold side to achieve the varying degrees of bonding across the cold side.

13. The article of claim 9, wherein a laminate of the ceramic matrix composite backing is disposed at an angle of about 45° relative to a major axis of the structural ceramic material.

14. A crack resistant gas turbine engine combustion liner tile, comprising:
   a structural ceramic tile having a hot side facing toward a high temperature environment and a cold side facing away from the high temperature environment;
   a fiber reinforced ceramic matrix composite backing member having a strength greater than the strength of the ceramic material; and
   a means for providing a varying degree of bonding across the cold side of the structural ceramic tile with the ceramic matrix composite backing member;
   wherein crack initiation or propagation within the structural ceramic tile is inhibited by the ceramic matrix composite backing member.

15. The article of claim 14, wherein the ceramic matrix composite backing member extends around an edge of the structural ceramic material.

16. The article of claim 14, wherein the ceramic matrix composite backing member comprises a plurality of stacked plies, the plies oriented at an angle of about 45° relative to a major axis of the structural ceramic tile.

17. The article of claim 14, wherein the means for providing a varying degree of bonding comprises an adhesive applied to only selected portions of the cold side and no adhesive applied to other portions of the cold side.

18. The article of claim 14, wherein the means for providing a varying degree of bonding comprises a first type of adhesive having a first strength in a first region and a second type of adhesive having a second strength different than the first strength in a second region.

* * * * *